US012771661B2

(12) United States Patent
Edwards et al.

(10) Patent No.: US 12,771,661 B2
(45) Date of Patent: Oct. 20, 2026

(54) SYSTEMS AND METHODS FOR MANAGING MODERN ATTACHMENTS IN ELECTRONIC MESSAGES

(71) Applicant: Bluesource, Inc., Grapevine, TX (US)

(72) Inventors: Matthew J. Edwards, Haslet, TX (US); Thomas M. Lounsbury, Poughkeepsie, NY (US); Simon D. Hashem, Las Vegas, NV (US); Austin T. Lauria, Waterford, VA (US); Jason J. Jensen, E. Stroudsburg, PA (US); Robert A. Guenther, III, Sarasota, FL (US)

(73) Assignee: Bluesource, Inc., Grapevine, TX (US)

( * ) Notice: Subject to any disclaimer, the term of this patent is extended or adjusted under 35 U.S.C. 154(b) by 10 days.

(21) Appl. No.: 18/883,845

(22) Filed: Sep. 12, 2024

(65) Prior Publication Data

US 2026/0075020 A1 Mar. 12, 2026

(51) Int. Cl.
*H04L 51/21* (2022.01)
*H04L 67/1097* (2022.01)

(52) U.S. Cl.
CPC .......... *H04L 51/21* (2022.05); *H04L 67/1097* (2013.01)

(58) Field of Classification Search
CPC ..... H04L 51/21; H04L 67/1097; H04L 51/18; G06F 16/9535
See application file for complete search history.

(56) References Cited

U.S. PATENT DOCUMENTS

| | | | | |
|---|---|---|---|---|
| 8,615,553 | B2 * | 12/2013 | Lucas | H04L 51/216 709/206 |
| 8,788,536 | B1 | 7/2014 | Bezbaruah et al. | |
| 9,043,420 | B2 * | 5/2015 | Griffin | G06F 3/0647 709/206 |
| 9,104,682 | B2 * | 8/2015 | Banerjee | G06F 16/164 |
| 9,508,055 | B1 * | 11/2016 | Webb | G06Q 10/10 |

(Continued)

OTHER PUBLICATIONS

International Search Report and Written Opinion of PCT/US2025/046019, mailed on Jan. 15, 2026, 13 Pages.

(Continued)

*Primary Examiner* — Oanh Duong
(74) *Attorney, Agent, or Firm* — Jeremiah J. Baunach; Frontier IP Law PLLC

(57) ABSTRACT

Systems and methods for managing modern attachments in electronic messages are disclosed. The system performs discovery on an organization's messaging repository to determine the extent of modern attachment usage across different platforms. A report is generated, including meta-data about the attachments and indicating inaccessible links. This report is used to determine handling procedures meeting organizational requirements. Messages are then migrated to a controlled environment where both messages and source files coexist. The system can establish a journaling platform for real-time capture of messages and attachments. For multiple organizations, the system performs discovery on respective repositories, generates custom reports, and migrates data to organization-specific locations. The system may also include functionality for eDiscovery collection functionality and generate audit reports about broken links.

20 Claims, 10 Drawing Sheets

(56) References Cited

U.S. PATENT DOCUMENTS

| | | | | |
|---|---|---|---|---|
| 9,583,130 | B2 * | 2/2017 | Bondurant | G06F 12/12 |
| 9,769,150 | B2 * | 9/2017 | Topatan | G06Q 10/107 |
| 9,887,943 | B2 * | 2/2018 | Yang | H04L 51/063 |
| 9,986,032 | B2 * | 5/2018 | Meisels | H04L 67/1097 |
| 11,132,755 | B2 * | 9/2021 | Raphael | G06N 5/02 |
| 2007/0168435 | A1 * | 7/2007 | Moraca | H04L 51/42 709/206 |
| 2016/0292207 | A1 * | 10/2016 | Watanabe | G06F 40/197 |
| 2016/0308812 | A1 * | 10/2016 | Johnstone | H04L 67/1097 |
| 2018/0234378 | A1 * | 8/2018 | Johnstone | H04L 67/02 |
| 2020/0134757 | A1 * | 4/2020 | Raphael | G06F 16/9024 |
| 2022/0245210 | A1 * | 8/2022 | Ford-Wilcox | G06F 16/955 |
| 2025/0272267 | A1 * | 8/2025 | Moldvai | G06F 16/1748 |

OTHER PUBLICATIONS

Anonymous: “Learn about eDiscovery (preview) solutions Miscrosoft Learn,” Aug. 23, 2023 (Aug. 23, 2023), URL: https://web.archive.org/web/2024082306, 3405/https://learn.microsoft.com/en-us/purview/edisc, 10 pages.

Anonymous: “Electronic discovery—Wikipedia,” Aug. 19, 2024 (Aug. 19, 2024), URL:https://en.wikipedia.org/w/index.php?title=Electronic_discovery&oldid=1241185941, 8 pages.

* cited by examiner

SYSTEMS AND METHODS FOR MANAGING MODERN ATTACHMENTS IN ELECTRONIC MESSAGES

TECHNICAL FIELD

The present disclosure relates to modern attachments in electronic messages, and particularly to managing such modern attachments in electronic messages.

BRIEF SUMMARY

Modern attachments, which are hyperlinks in electronic messages that point to files or folders in cloud storage, have become increasingly prevalent in digital communication. These links replace traditional file attachments, reducing message size and enabling more efficient sharing of large files. However, this shift has introduced new challenges in the realm of eDiscovery and data management.

A primary issue with modern attachments is their volatility. Unlike traditional attachments, the content linked by modern attachments can be easily altered, moved, or deleted between the time a message is sent and when it needs to be accessed for eDiscovery or legal purposes. This creates significant challenges in maintaining data integrity and compliance with legal and regulatory requirements. Additionally, organizations often lack comprehensive tools to effectively manage, track, and preserve these modern attachments across different platforms and storage solutions.

The systems and methods described herein address these challenges by providing a comprehensive and novel technical approach for managing modern attachments in electronic messages. They perform discovery on an organization's messaging repository to determine the extent of modern attachment usage, generate detailed reports, and facilitate the migration of messages and their associated modern attachments to a controlled environment.

In an example embodiment, various features of the systems and methods described herein for managing such modern attachments in electronic messages include: a reporting tool that analyzes the organization's messaging repository and provides detailed insights into modern attachment usage; a migration process that moves messages and their associated modern attachments to a unified, controlled environment, preserving the integrity of the linked content; an eDiscovery/Legal Hold process that ensures modern attachments are properly preserved and can be produced when required for legal purposes; and a journaling system that captures messages and their modern attachments in real-time, creating a comprehensive record for compliance and eDiscovery purposes. These systems and methods can handle modern attachments across various platforms, including cloud-based and on-premises solutions.

The systems and methods described herein may utilize techniques such as shadow copy functionality, API integrations with various storage and messaging platforms, and data processing to provide a robust solution for modern attachment management.

In an example embodiment, a technique for managing modern attachments in electronic messages comprises performing discovery on an organization's messaging repository to determine the extent of modern attachment usage across different storage and message platforms. Based on this discovery, a report is generated that includes metadata about the modern attachments and indicates which links cannot be accessed. This report is then utilized to determine how modern attachments should be handled to meet the organization's specific requirements. Following this analysis, messages are migrated from their existing platform to a location where both the messages and the source files of corresponding modern attachments exist in the same controlled environment.

The systems and methods also include establishing a journaling platform that copies messages as they are sent or received, collecting the source files of any modern attachments and depositing both in the same controlled environment. For organizations with multiple messaging repositories, the system can perform discovery on respective repositories of different organizations, generate custom reports for each, and migrate messages and attachments to organization-specific controlled environments.

Furthermore, the technique incorporates functionality for performing eDiscovery collection on data at rest, identifying messages and modern attachments associated with custodians on legal hold, copying this data to secure storage, and preventing unauthorized access. The system generates audit reports that include information about broken links and links that could not be retrieved, providing data for maintaining data integrity and troubleshooting issues related to modern attachments.

By implementing these comprehensive processes and features, the systems and methods described herein provide a robust solution for managing modern attachments across various scenarios, from everyday use to complex eDiscovery and legal hold situations, addressing the unique challenges posed by modern attachments.

DETAILED DESCRIPTION

Figure 1:
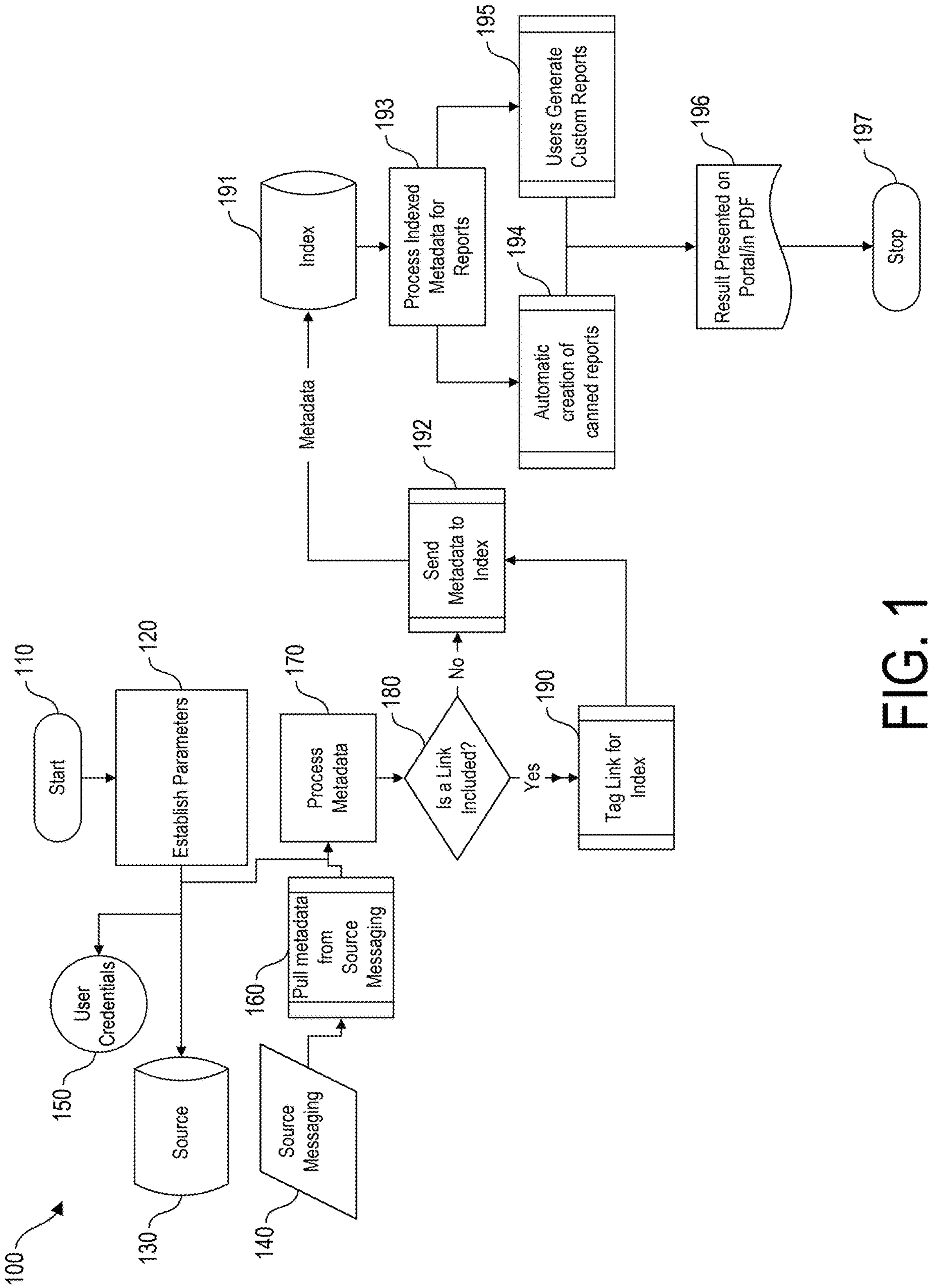
FIG. 1 is a diagram illustrating a reporting tool process for modern attachments, according to various embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Modern attachments, which are hyperlinks in electronic messages that point to files or folders in cloud storage, have become a significant issue in eDiscovery. These links can be easily broken by moving, deleting, or altering the target, making them non-discoverable to many eDiscovery solutions. This invention addresses the challenges posed by modern attachments in electronic messages, ensuring that organizations can effectively handle these attachments for eDiscovery, legal hold, and general data management purposes.

The system and method described herein are particularly relevant for organizations that are receiving or using modern attachments from employees or third parties (person(s) or system(s)) that hinder their ability to perform relevant data governance for their organization. The invention provides a comprehensive approach to reporting, recovering, capturing, and managing modern attachments from different vendors and/or different tenants.

FIG. 1 illustrates a reporting tool process 100 for modern attachments. This process may be the first step of discovery, determining the extent to which modern attachments are utilized within an organization's messaging repository. The tool may have an administrative interface and central traffic coordination component with Application Programming Interfaces (APIs) that connect to a wide variety of storage and message platforms. This component enables the addition of new and custom APIs to address whatever source or destination platform is used by an organization. The tool may also have an indexing engine that stores metadata pulled from messaging platforms and a web-based interface used for presenting canned reports and creating custom reports based on data pulled from the index.

In an example embodiment shown in FIG. 1, a process implemented by the tool starts at 110 and proceeds to an establish parameters phase 120. This component sets up the initial configuration for the reporting process, including defining the source 130 and source messaging 140 components. User credentials 150 are used to authenticate and access these sources.

The process then moves to a pull metadata from source messaging component 160, which extracts relevant information from the defined sources. This metadata is then processed in the process metadata component 170. At this stage, the system checks if a link is included in the metadata through an "is a link included?" decision component 180. If a link is found, it is tagged for indexing in the tag link for index component 190. Whether a link is found or not, the metadata is sent to the index 191 in the send metadata to index component 192.

The indexed data is stored in the index component 191, which serves as a centralized repository for all processed metadata. This indexed data is then used to generate reports in the process indexed metadata for reports component 193. The system provides two types of reporting: automatic creation of canned reports 194 for standardized information, and a feature for users to generate custom reports 195.

Finally, the results are presented on a portal or in PDF format in the results presentation component 196, making the information easily accessible to users. The process concludes at 197. Throughout the process, data flow connections ensure smooth transfer of information between various components.

As shown in the technique above, back-end processes pull metadata from sources pinpointed in the establish parameters phase 120 and send that data to an index 191 for processing. Indexed data is then processed into canned reports for viewing in a web-browser interface. Further accommodation can then be made for custom reports requested by the client.

This reporting process is useful for organizations to understand the scope of modern attachment usage and to plan appropriate strategies for managing them.

The systems and methods for managing modern attachments in electronic messages described herein provide viable collection strategies across three scenarios. The first scenario involves migrating data from one messaging system to another or to an archival repository. The second scenario addresses the needs of electronic discovery (eDiscovery) collection and legal hold processes for data at rest. The third scenario focuses on journaling, which involves collecting messages and their attachments as they are sent or received in real-time.

Regardless of the specific scenario, these systems and methods incorporate several elements to ensure a robust solution for managing modern attachments. One element is the 'Shadow Copy' functionality. This feature creates a copy of the content targeted by modern attachments, stores this copy in a common storage area, and then updates the link in the copied message to point to this new location. This technique preserves the integrity of the attachment content, even if the original linked file is later modified or becomes inaccessible.

Another element is the reporting functionality. This feature provides detailed metadata about the file paths of modern attachments, with particular emphasis on attachments that could not be resolved. Such reporting is useful for identifying and addressing any issues with inaccessible or broken links.

The system also incorporates identification capabilities to distinguish modern attachments from other types of links, such as standard Uniform Resource Locators (URLs). This functionality includes the ability to filter out links to sites or directories that are not part of an agreed-upon Electronically Stored Information (ESI) protocol, ensuring that only relevant attachments are processed and preserved.

While these core features are common across all scenarios, the specific functionality of the system adapts to meet the unique requirements of each use case, whether it is facilitating a seamless migration, supporting comprehensive eDiscovery processes, or enabling real-time journaling of messages and their modern attachments. This flexibility allows organizations to effectively manage their modern attachments across various operational contexts, addressing the complex challenges posed by these cloud-based attachments a digital communication landscape.

Figure 2:
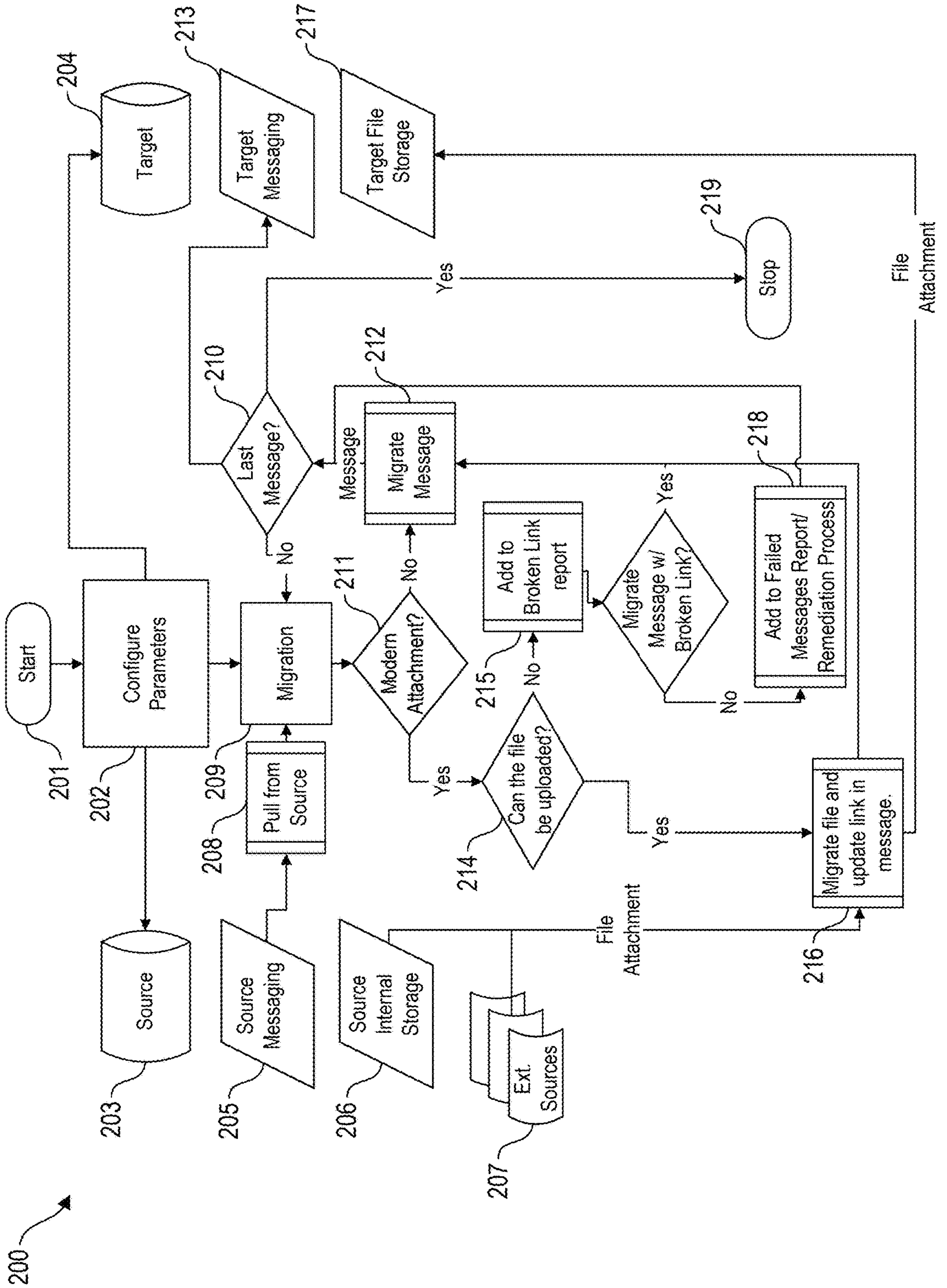
FIG. 2 is a diagram illustrating a migration process for modern attachments using a cloud storage method, according to various embodiments described herein.

FIG. 2 depicts a migration process 200 for modern attachments using a cloud storage method. This process is part of the solution to address the issue of modern attachments by migrating messages from their existing platform to a solution where both the message and the source files of corresponding modern attachments exist in the same controlled environment.

The systems and methods described herein for managing modern attachments during migration comprise several components to facilitate efficient and comprehensive data transfer. One such component is an administrative interface and central traffic coordination module that incorporates APIs capable of connecting to a diverse range of storage and message platforms. This component includes the integration of new and custom APIs, enabling organizations to address their specific source or destination platforms as needed.

Another component is a migration engine that leverages these APIs to extract messaging from various sources. This engine identifies modern attachments within the messages, retrieves the source files from the links, performs necessary processing, and then transmits both the messages and files to their designated destination storage.

The system also includes a reporting component that monitors the progress of the migration. This component generates detailed reports on the migration process, including information about any items that failed to migrate successfully.

One, non-limiting example process for handling modern attachments during migration, taking into account the aforementioned components, is illustrated by the migration process 200 of FIG. 2. Process 200 outlines the steps involved in migrating messages and their associated modern attachments, demonstrating how the system handles different scenarios that may arise during the migration process. As an overview, the process 200 includes establishing the parameters to access the source messaging, source of the modern attachments, and destination storage. The process then includes running the migration process and reporting the results. If the process was set not to migrate messages with broken links, the process 200 remediates the issues with those messages and retries migration on those messages. This technique to migration ensures that various aspects of modern attachments are addressed, from initial identification to final storage, providing a comprehensive solution for organizations seeking to manage their digital communications effectively across different platforms and storage solutions.

In an example embodiment, the process 200 begins at 201. From here, it moves to the Configure Parameters step 202, which sets up the migration parameters. In the Configure Parameters step 202, the system establishes the parameters to access the Source Messaging 205, source of the modern attachments (Source 203), and destination storage (Target 204).

The migration process then enters a loop, starting with the Pull from Source step 208, which extracts data from Source Messaging 205 and then proceeds to check if the message contains a Modern Attachment? 211.

If there is no modern attachment, it migrates the message at 212 to Target Messaging 213. If there is a modern attachment, it checks whether the file can be uploaded at 214.

If the file cannot be uploaded, it is added to a broken link report at 215. If it can be uploaded, the process migrates file and updates link in the message at 216, sending the file to Target File Storage 217 and updating the message in Target Messaging 213.

If the file was added to the broken link report at 215 and it is decided that it cannot be migrated, it is added to the failed messages report and a remediation process is performed at 218. This step, along with the migrate message step 212, feeds back into the Migration loop 209 before first checks if it is the last message at 210. Once the Last Message? check 210 returns Yes, the process moves to the Stop component 219, concluding the migration.

The Source Internal Storage 206 and External Sources 207 feed into the Migrate file and update link in message operation 216 to store file attachments from the Source Internal Storage 206 and External Sources 207 in the Target File Storage 217.

This comprehensive process ensures that all messages and their attachments, whether traditional or modern, are properly migrated, with appropriate handling for broken links and failed migrations. It provides a robust solution for managing the complexities of modern attachments in data migration scenarios.

Figure 3:
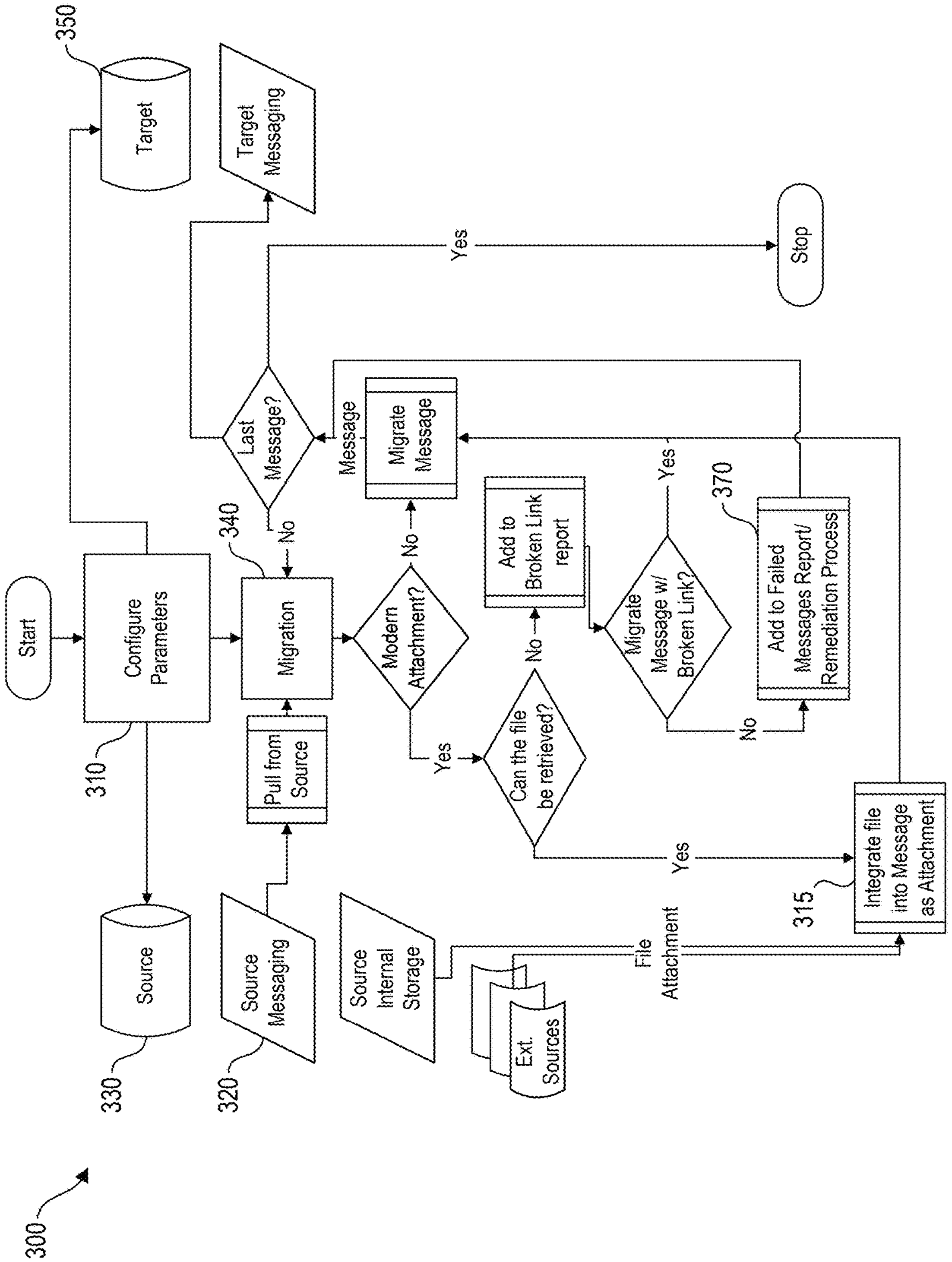
FIG. 3 is a diagram illustrating a migration process for modern attachments using a reintegration method, according to various embodiments described herein.

FIG. 3 illustrates a migration process 300 for modern attachments using a reintegration method. The process 300 differs from process 200 of FIG. 2, in that instead of the modern attachment being sent to separate storage with a modified link, it is added to the message itself as a standard attachment.

Similar to FIG. 2, process 300 begins with establishing parameters in the Configure Parameters stage 310 for source messaging 320 and source of modern attachments (Source 330). The migration engine 340 in this process not only transfers data but also causes reintegration of modern attachments into the messages themselves at the Integrate File into Message as Attachment operation 315.

The destination storage (Target 350) in the present example embodiment receives messages with the formerly linked attachments now embedded directly. As with the cloud storage method, this process includes an Add to Failed Messages Report/Remediation Process Component 370 to handle any problems that arise during migration. In an example embodiment, in each process 200 and process 300, the tool is not only copying messages from the message source but also copying from multiple other sources where the targets of the modern attachments are held. This presents some challenges that may be identified during the Configure Parameters stage 310 stage as well as during the migration itself, namely: Can the file sources be accessed with available credentials?; Are the file sources internal or external?; and If external, are there rules preventing file copy?

Such issues may be addressed and resolved on a case-by-case basis in the present example embodiment. The ability described herein to establish what sources would be pulled from and which would be allowed ahead of time facilitates streamlining this process. This may be achieved by having a Report Mode that runs prior to the actual migration.

Figure 4:
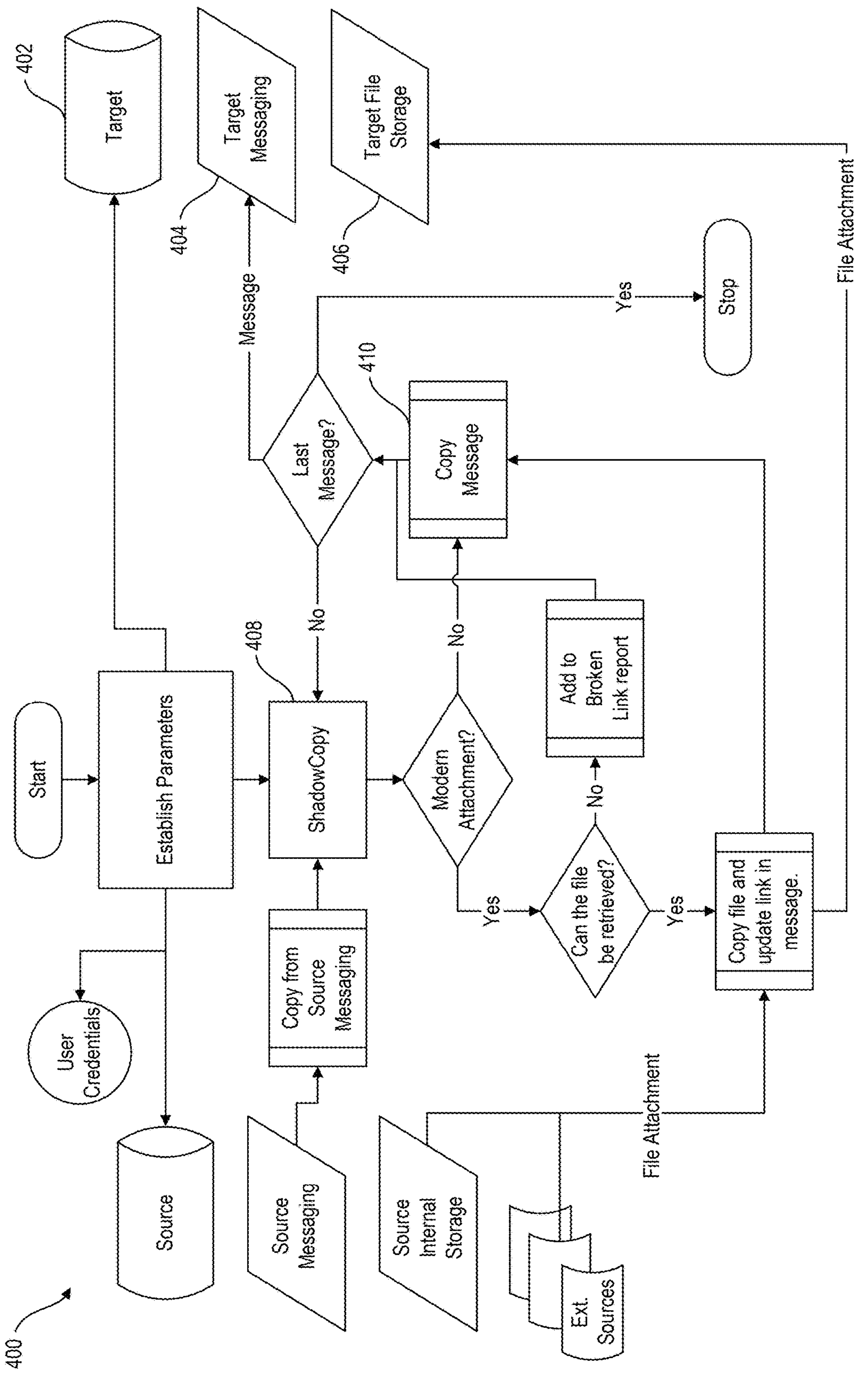
FIG. 4 is a diagram illustrating an eDiscovery/Legal Hold process for managing modern attachments, according to various embodiments described herein.

FIG. 4 shows an eDiscovery/Legal Hold process 400 for managing modern attachments. The process for eDiscovery/Legal Hold is similar to that of migration process 200 and migration process 300, but more directed to those sources and people (e.g., message recipients) who are on hold and discoverable. Primary differences include the Target storage (Target 402, Target Messaging 404 and Target File Storage 406) have a 'hold' feature that keeps data until the hold is released. In some embodiments, those on hold may have the option of manually adding messaging to the hold storage. However, those on hold do not have access to the content at the target storage. This is a 'shadow copy' system implemented by Shadow Copy Component 408 and the Copy Message Component 410. In the present example embodiment, there is no option to copy messages with broken links. In particular, it may be assumed that with a legal hold, issues must be mitigated so that the full message and attachment are put on hold. This legal hold process 400 ensures that modern attachments are properly preserved and can be produced if required.

Figure 5:
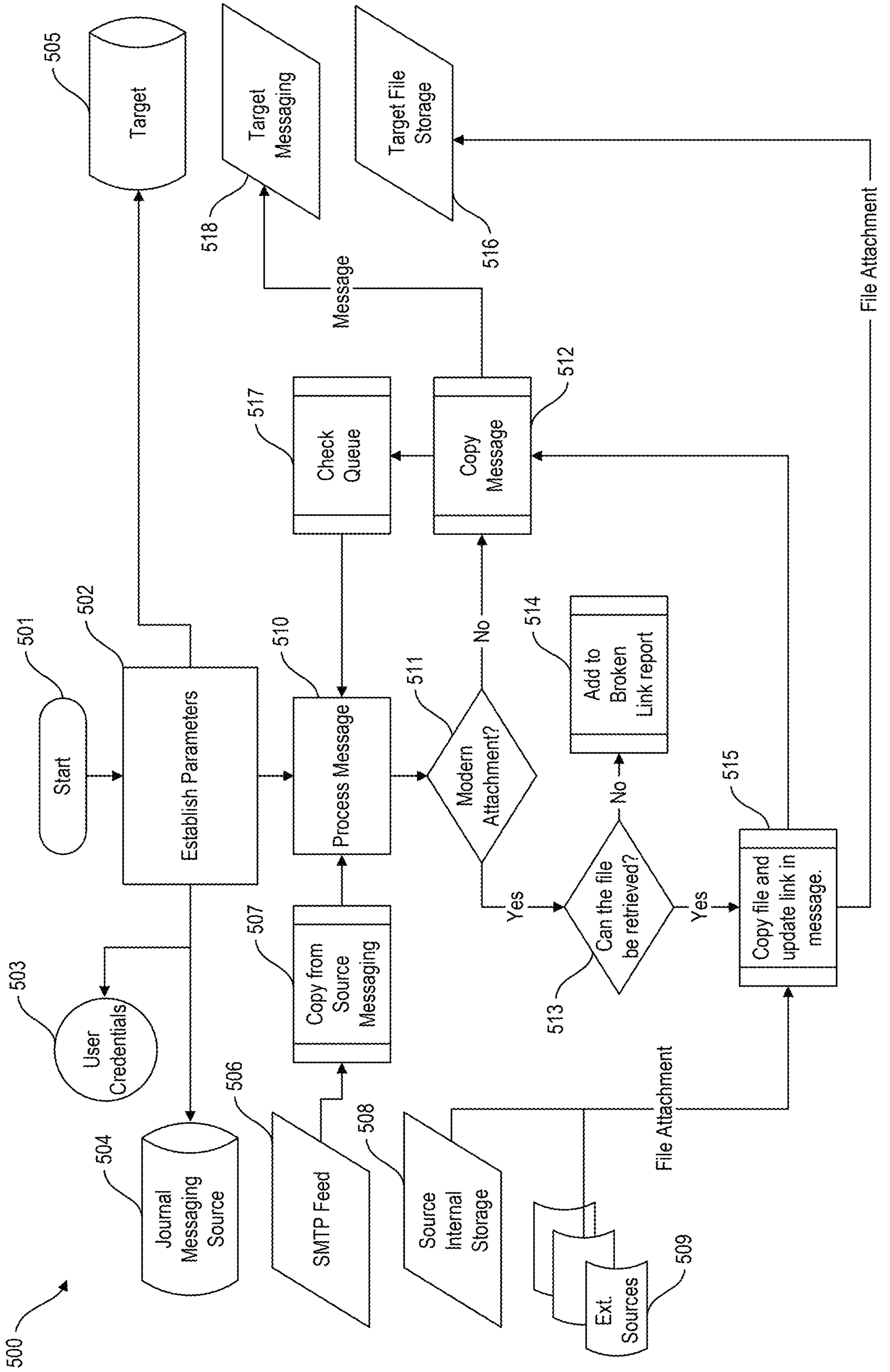
FIG. 5 is a diagram illustrating a journaling process for managing modern attachments, according to various embodiments described herein.

FIG. 5 depicts an example journaling process 500 for managing modern attachments. This process provides a technique for capturing messages as they are sent or received, along with their associated modern attachments.

The process 500 begins with a Start component 501, initiating the journaling workflow.

The first step is to establish parameters at the Establish Parameters Phase 502, which configures the journaling process. This step interacts with User Credentials 503, Journal Messaging Source 504, and Target 505 to set up the necessary access and destinations for the journaling operation.

The process 500 then moves to the main loop, which starts with the SMTP Feed 506. This represents the incoming stream of messages to be journaled. The Copy from Source Messaging step 507 extracts messages from the SMTP Feed 506. Data from the Source Internal Storage 508 and External Sources 509 may also feed into this process via the Copy File and Update Link in Message step 515.

Once a message is copied, it enters the Process Message step 510. Here, the system analyzes the message to determine if it contains a Modern Attachment 511. If the message does not contain a modern attachment, it proceeds directly to the Copy Message step 512.

If a modern attachment is detected, the system checks Can the file be retrieved? 513. This step is useful for maintaining the integrity of modern attachments during the journaling process. If the file cannot be retrieved, it is added to a broken link report a Add to Broken Link Report step 514. This report is for tracking and potentially resolving issues with inaccessible modern attachments.

If the file can be retrieved, the system proceeds to Copy file and update link in message step 515. Step 515 creates a copy of the attachment in the Target File Storage 516 and updates the link in the message to point to this new location.

After processing the attachment (if any), the message is sent to the Check Queue step 517 to retrieve the next message and proceed again to the Process Message step 510. This ensures that messages are processed in the correct order and that no messages are lost. From here, the message is sent to the Target Messaging 518 system.

This process continues in a loop, constantly monitoring for new messages and processing them accordingly. In an example embodiment, the journaling process 500 described herein may address several challenges inherent in capturing live messaging as messages are sent and received. One such challenge arises from cloud solutions, such as Microsoft 365, which utilize their own shadow-copy functionality, potentially rendering traditional journaling approaches redundant. Additionally, the journaling system may encounter difficulties in accessing the targets of modern attachments, particularly when dealing with incoming mail from external sources where the system lacks the necessary credentials.

To address these challenges, process 500 may incorporate a determination process within the Establish Parameters Phase 502. This process distinguishes between modern attachments that must be captured for compliance purposes and other types of links that may be disregarded. Such distinction ensures that the system focuses its resources on relevant content while maintaining efficiency.

Furthermore, process 500 implements a comprehensive reporting mechanism to audit broken links and links that could not be retrieved. This reporting functionality, as illustrated by the Add to Broken Link Report step 514, captures essential information about each problematic link. The report includes the link itself, the timestamp of the retrieval attempt, and a detailed explanation of why the source item could not be accessed. This level of detail in reporting facilitates troubleshooting and ensures a complete audit trail for compliance purposes.

By incorporating these features, the system provides a robust solution for capturing and managing modern attachments in live messaging scenarios, even when faced with the complexities of cloud-based systems and external content sources. This technique enables organizations to maintain comprehensive records of their electronic communications, including modern attachments, in a manner that satisfies compliance requirements and supports potential eDiscovery needs.

In many of the processes described hereon, the system implements 'Shadow Copy' functionality, which takes a copy of modern attachment targets, places them in a common storage area, and redirects the modern attachment link in the copied message. This technique ensures that the content of modern attachments is preserved, even if the original linked file is later modified or becomes inaccessible.

The systems and methods described herein also include robust reporting functionality that provides metadata about modern attachments, including file paths and information about attachments that could not be resolved. This reporting is crucial for organizations to understand the scope of their modern attachment usage and to identify potential issues.

Furthermore, the systems and methods described herein identify modern attachments versus other types of links, such as general URLs. This capability enables filtering out of links to sites or directories that may not be included in an Electronically Stored Information (ESI) protocol, ensuring that only relevant attachments are processed and preserved.

Figure 6:
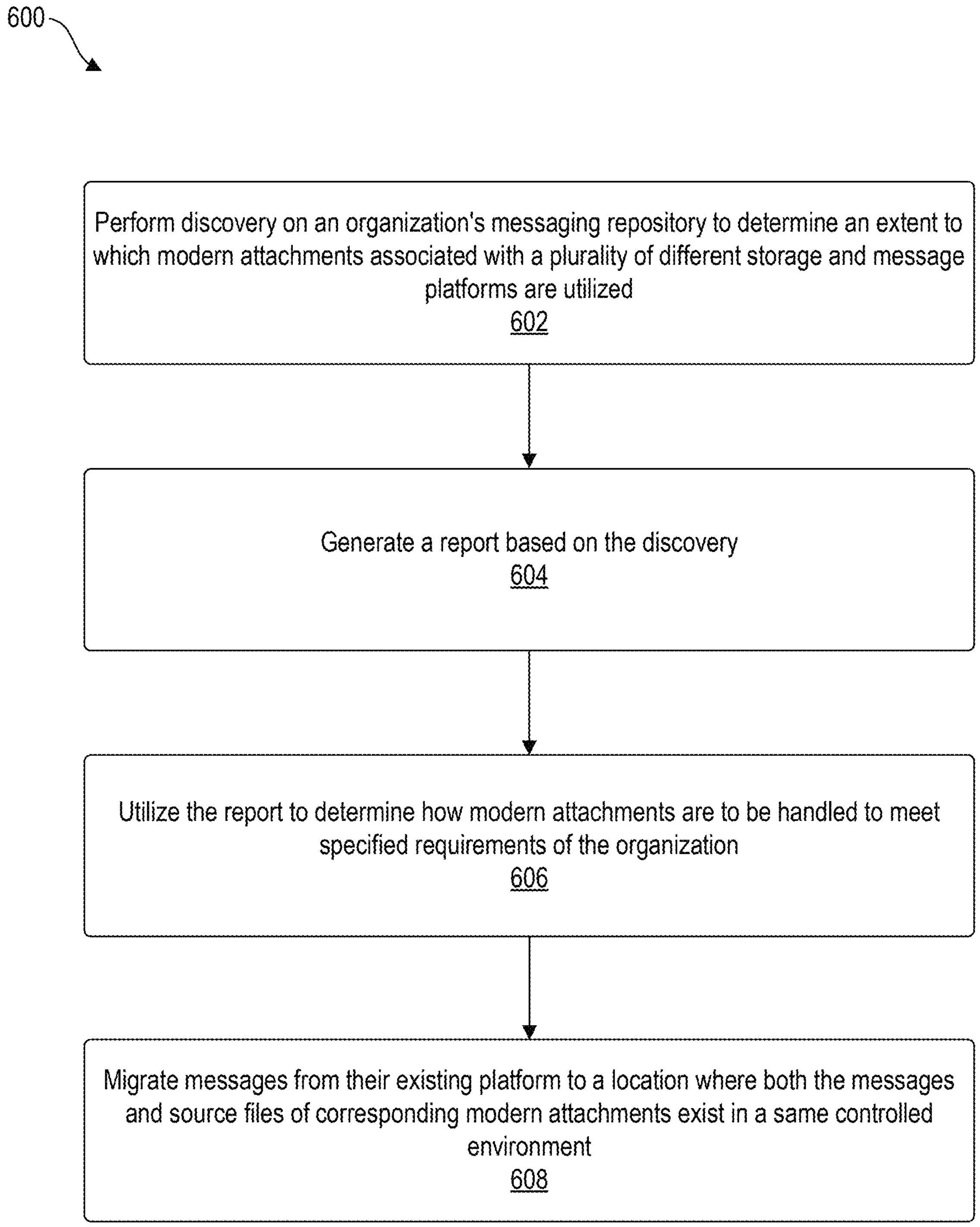
FIG. 6 is a flow diagram illustrating a method for managing modern attachments in electronic messages, according to various embodiments described herein.

FIG. 6 is a flow diagram illustrating a method 600 for managing modern attachments in electronic messages, according to various embodiments described herein.

At 602, the system electronically performs discovery on an organization's messaging repository to determine an extent to which modern attachments associated with a plurality of different storage and message platforms are utilized, wherein modern attachments are hyperlinks in electronic messages that point to files or folders in cloud storage.

At 604, the system electronically generates a report based on the discovery, the report including metadata about the modern attachments and indicating which modern attachment links cannot be accessed.

At 606, the system electronically utilizes the report to determine how modern attachments are to be handled to meet specified requirements of the organization.

At 608, the system, based on the report, electronically migrates messages from their existing platform to a location where both the messages and source files of corresponding modern attachments exist in a same controlled environment.

Figure 7:
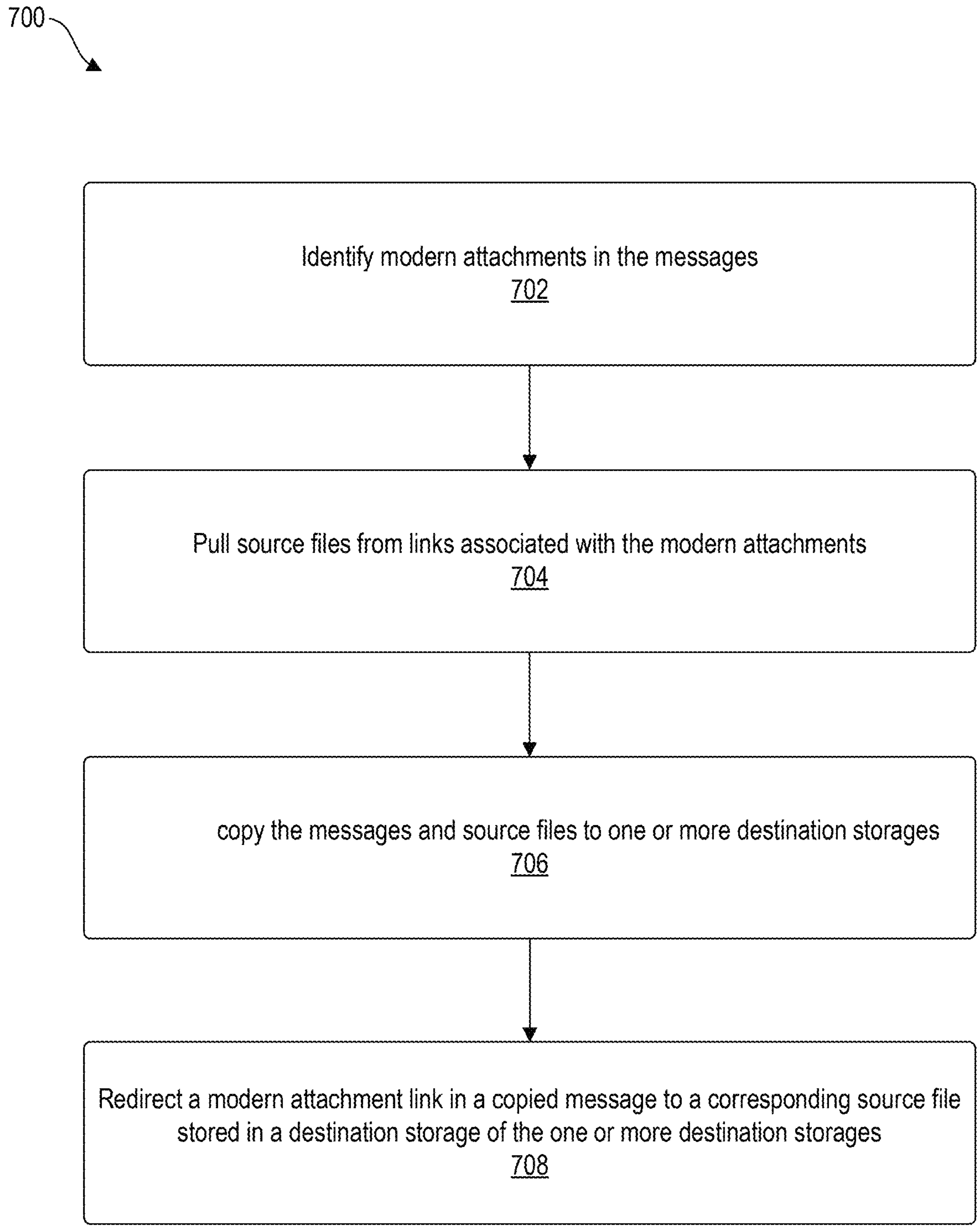
FIG. 7 is a flow diagram illustrating a method for migrating messages with modern attachments, according to various embodiments described herein.

FIG. 7 is a flow diagram illustrating a method for migrating messages with modern attachments, according to various embodiments described herein.

At 702, the system identifies modern attachments in the messages. This step may include analyzing the content of each message to detect hyperlinks that point to files or folders in cloud storage.

At 704, the system pulls source files from links associated with the modern attachments. This process may include accessing the cloud storage locations referenced by the hyperlinks and retrieving the associated files.

At 706, the system copies the messages and source files to one or more destination storages. This step may include ensuring that both the original messages and the content of their modern attachments are preserved in the new location.

At 708, the system redirects a modern attachment link in a copied message to a corresponding source file stored in a destination storage of the one or more destination storages. This may include updating the hyperlink in the migrated message to point to the newly stored copy of the attachment, maintaining the integrity of the link within the controlled environment.

Figure 8:
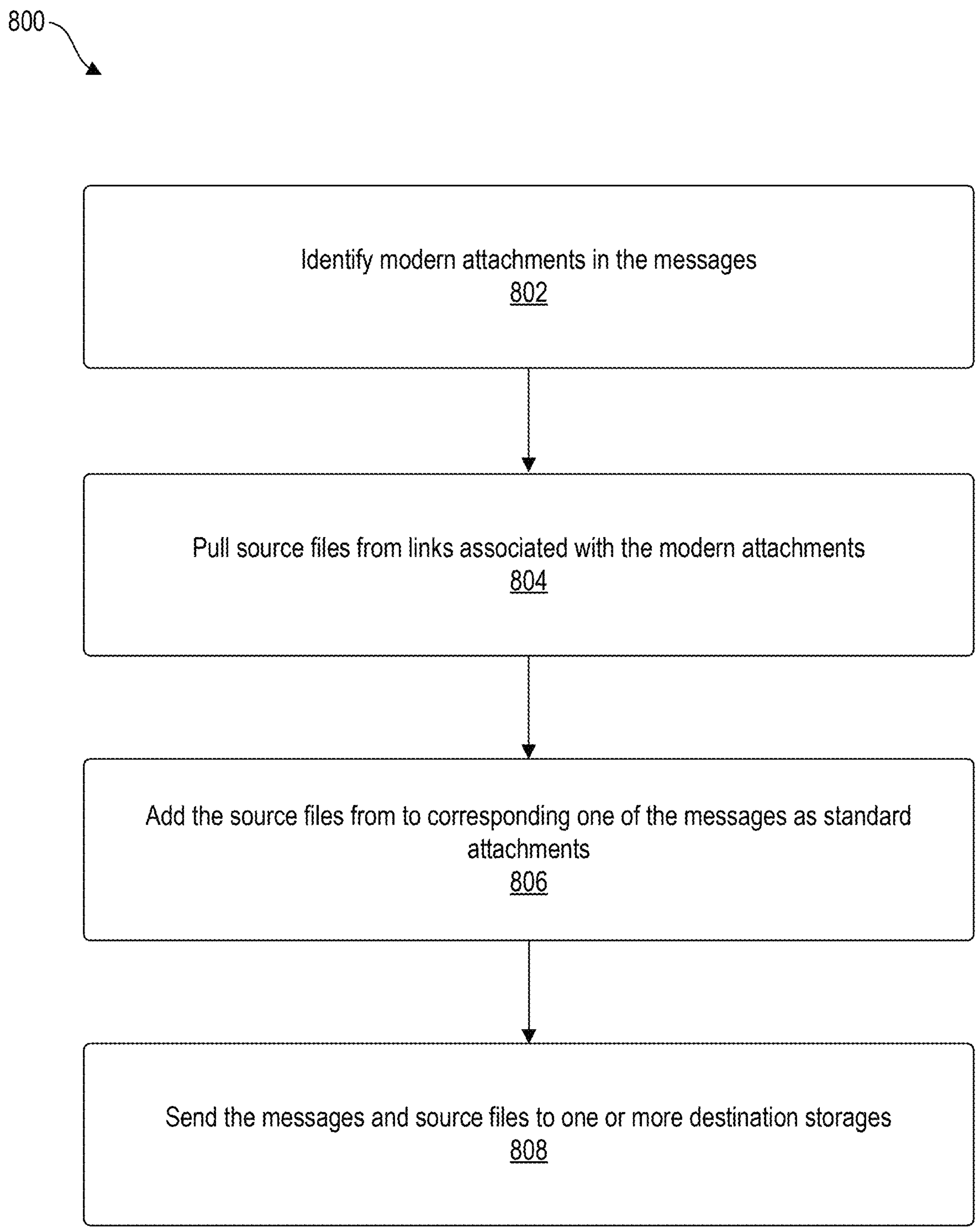
FIG. 8 is a flow diagram illustrating a method for migrating messages with modern attachments in which the target file of the modern attachment is attached into the message, according to various embodiments described herein.

FIG. 8 is a flow diagram illustrating a method for migrating messages with modern attachments in which the target file of the modern attachment is attached into the message, according to various embodiments described herein.

At 802, the system identifies modern attachments in the messages.

At 804, the system pulls source files from links associated with the modern attachments.

At 806, the system adds the source files to corresponding ones of the messages as standard attachments. This may include embedding the previously linked content directly into the message.

At 808, the system sends the messages and source files to one or more destination storages. This may include ensuring that the messages, now with standard attachments, are stored in the new location.

Figure 9:
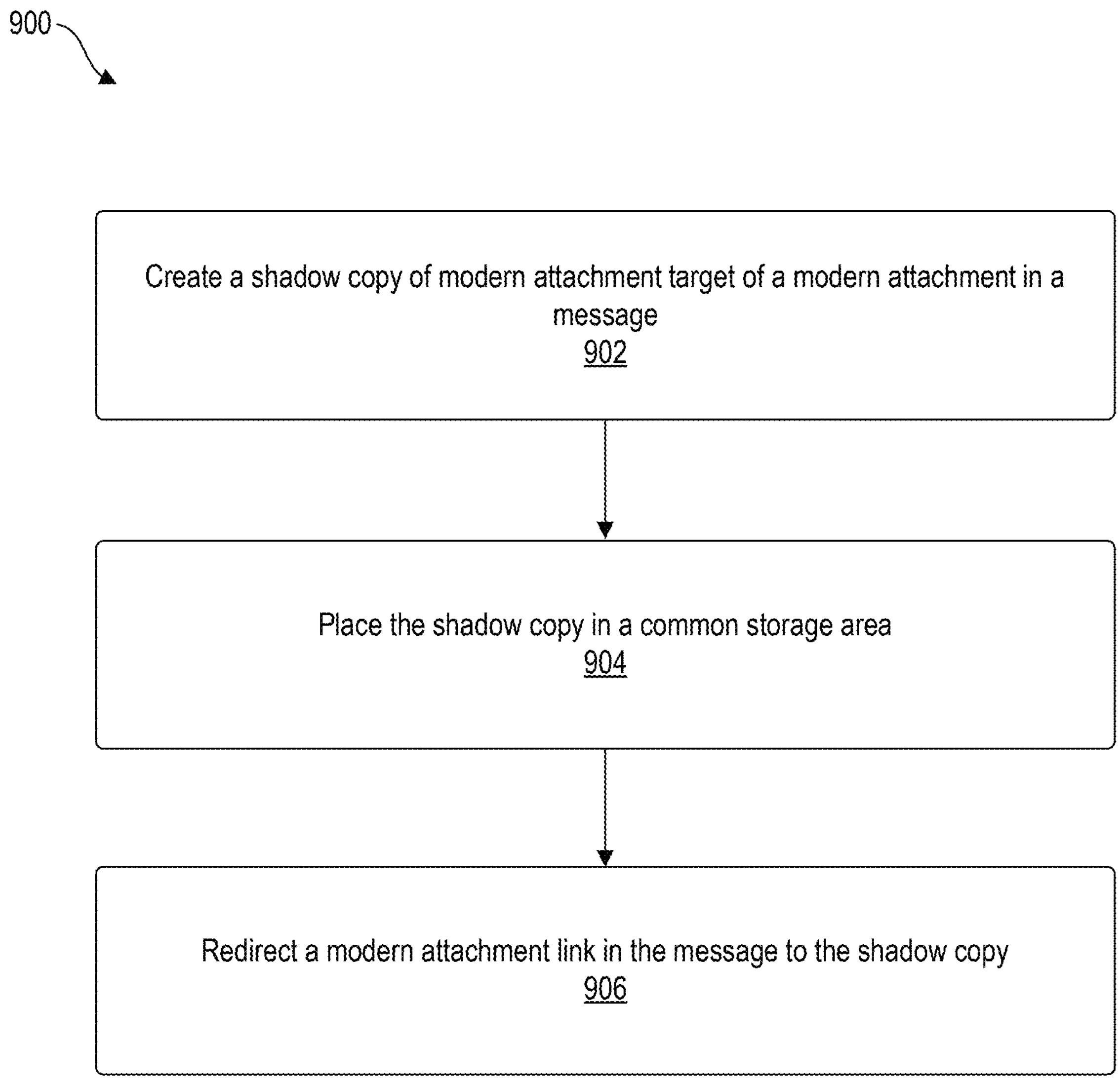
FIG. 9 is a flow diagram illustrating a method for creating shadow copies of modern attachments during message migration, according to various embodiments described herein.

FIG. 9 is a flow diagram illustrating a method for creating shadow copies of modern attachments during message migration, according to various embodiments described herein.

At 902, the system creates a shadow copy of a modern attachment target of a modern attachment in a message. This may include making a duplicate of the file or folder referenced by the hyperlink.

At 904, the system places the shadow copy in a common storage area. This may include ensuring that the copied content is stored in a centralized, controlled location.

At 906, the system redirects a modern attachment link in the message to the shadow copy. This may include updating the hyperlink in the message to point to the newly created shadow copy, maintaining the functionality of the link within the controlled environment.

The systems and methods described herein may also be applied across multiple organizations, providing a scalable solution for managing modern attachments in diverse environments. In this context, the system performs discovery operations on the respective messaging repositories of a plurality of different organizations. This discovery process aims to determine the extent to which modern attachments are utilized by each organization, providing a comprehensive overview of usage patterns across various entities.

Following the discovery phase, the system generates a custom report for each organization based on the findings. These reports include detailed metadata about the modern attachments associated with each specific organization. Importantly, the reports also indicate which modern attachment links cannot be accessed, highlighting potential issues or areas of concern. This customized reporting ensures that each organization receives relevant and actionable information about their modern attachment usage and any associated challenges.

The system then utilizes these custom reports to determine how modern attachments should be handled for each organization. This determination takes into account the specified requirements of each organization, allowing for tailored approaches that align with individual organizational needs, compliance standards, and operational practices.

Once the handling approach is determined, the system proceeds with a migration process for each organization. This may include moving messages associated with each organization from their respective existing platforms to organization-specific locations. These designated locations serve as controlled environments where both the messages and the source files of corresponding modern attachments coexist. This migration ensures that all relevant data is preserved and easily accessible within a unified, controlled space specific to each organization.

By implementing this multi-organizational approach, the system provides a scalable and flexible solution for managing modern attachments across diverse corporate environments. It enables organizations to maintain control over their data while benefiting from a standardized yet customizable process for handling modern attachments. This approach is particularly valuable for conglomerates, managed service providers, or any scenario where multiple distinct organizations require coordinated management of their electronic communications and associated modern attachments.

The system may also establish a journaling platform that copies messages as they are sent or received while collecting source files of any modern attachments and depositing both in the same controlled environment. This real-time capture ensures that no modern attachments are missed, even if they are later modified or deleted.

For organizations with multiple messaging repositories, the system can perform discovery on respective repositories of different organizations to determine the extent of modern attachment usage in each. It generates custom reports for each organization based on this discovery, allowing for tailored solutions to meet each organization's specific needs.

The system may also include functionality for performing eDiscovery collection on data at rest. This process involves identifying messages and modern attachments associated with custodians on legal hold, copying the identified data to a hold storage with a feature that retains data until the hold is released, and preventing custodians from accessing content in the hold storage.

Furthermore, in an example embodiment, the system may generate audit reports that include information about broken links and links that could not be retrieved. These reports include the link itself, the time and date of the attempt to retrieve the link, and the reason why a source item could not be retrieved. This audit functionality may facilitate maintaining the integrity of the data and may be utilized for troubleshooting any issues that arise during the management of modern attachments.

Figure 10:
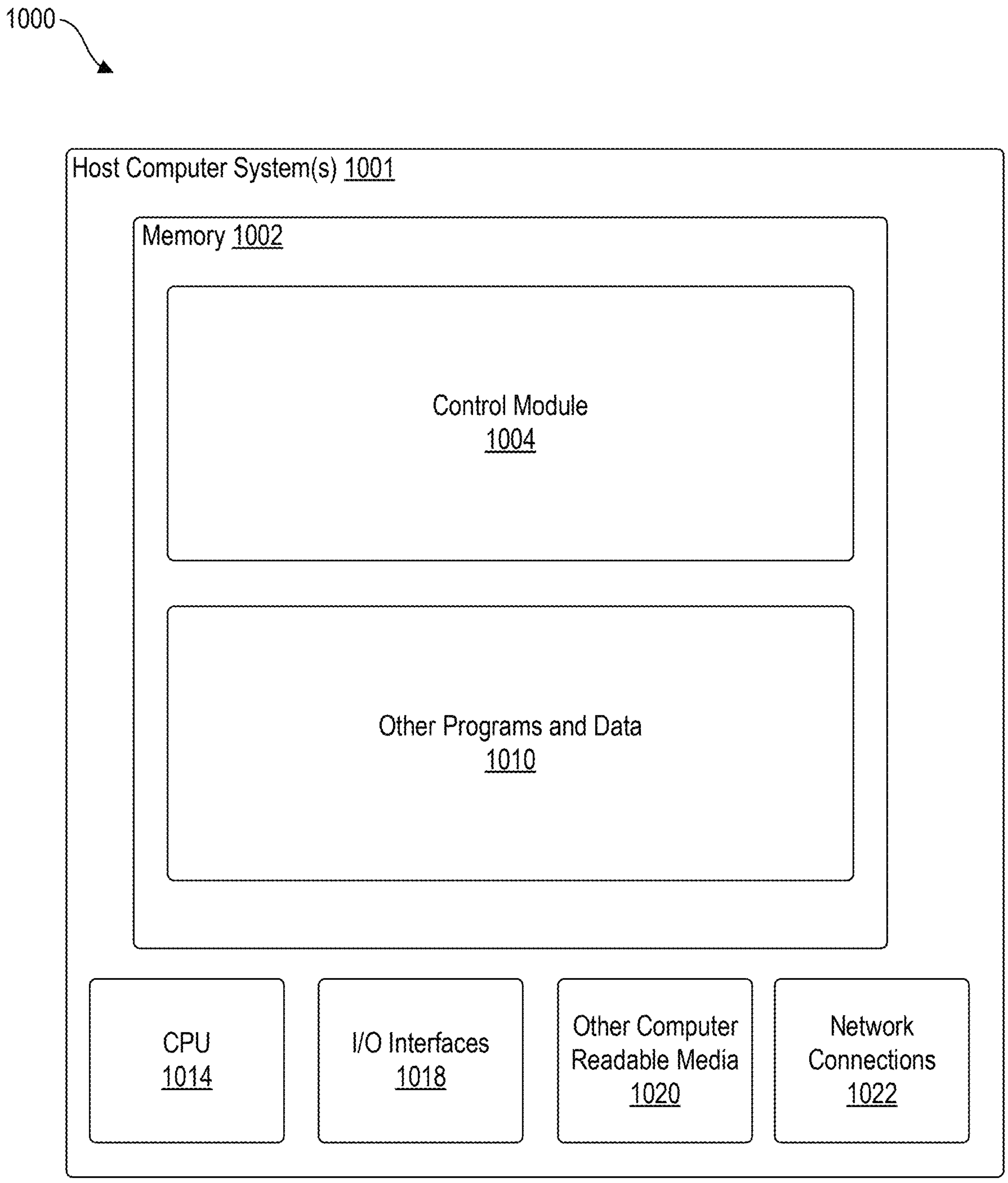
FIG. 10 shows a system diagram that describes an example implementation of computing system(s) for implementing embodiments described herein.

FIG. 10 shows a system diagram that describes an example implementation of computing system(s) 1000 for implementing embodiments described herein.

The functionality described herein for managing modern attachments in electronic messages can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 10 illustrates an example of underlying hardware on which such software and functionality may be hosted and/or implemented.

In particular, shown is example host computer system(s) 1001. For example, such computer system(s) 1001 may represent one or more of those in various data centers, servers, network nodes, email servers, and cloud storage systems shown and/or described herein that are, or that host or implement the functions of: modern attachment management, reporting tools, migration processes, eDiscovery/Legal Hold processes, journaling processes, and other aspects described herein for managing modern attachments in electronic messages. In some embodiments, one or more special-purpose computing systems may be used to implement the functionality described herein. Accordingly, various embodiments described herein may be implemented in software, hardware, firmware, or in some combination thereof. Host computer system(s) 1001 may include memory 1002, one or more processors such as central processing units (CPUs) 1014, I/O interfaces 1018, other computer-readable media 1020, and network connections 1022.

Memory 1002 may be coupled to CPUs 1014 and include one or more various types of non-volatile and/or volatile storage technologies. Examples of memory 1002 may include, but are not limited to, a computer-readable storage medium, flash memory, hard disk drives, optical drives, solid-state drives, various types of random access memory (RAM), various types of read-only memory (ROM), neural networks, other computer-readable storage media (also referred to as processor-readable storage media and non-transitory computer-readable storage media), or the like, or any combination thereof. Memory 1002 may be utilized to store information, including computer-readable and computer-executable instructions that are utilized and executed by CPU 1014 to cause operations to be performed, including those of embodiments described herein.

Memory 1002 may have stored thereon control module(s) 1004. The control module(s) 1004 may be configured to implement and/or perform some or all of the functions of the systems, components and modules described herein for managing modern attachments in electronic messages. Memory 1002 may also store other programs and data 1010, which may include rules, databases, application programming interfaces (APIs), rules and data, software containers, nodes, clusters, virtualized environments, software platforms, cloud computing service software, email management software, storage management software, modern attachment processing modules, artificial intelligence (AI) or machine learning (ML) programs or models to perform the functionality described herein, user interfaces, operating systems, other network management functions, and other functions related to modern attachment management.

Network connections 1022 are configured to communicate with other computing devices to facilitate the functionality described herein. In various embodiments, the network connections 1022 include transmitters and receivers (not illustrated), email server interfaces, cloud storage interfaces, and/or other network equipment and interfaces to send and receive data as described herein, such as to send and receive instructions, commands and data to implement the processes described herein for managing modern attachments. I/O interfaces 1018 may include email interfaces, file system interfaces, other data input or output interfaces, or the like. Other computer-readable media 1020 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for managing modern attachments in electronic messages, the method comprising:

electronically performing discovery on an organization's messaging repository to determine an extent to which modern attachments associated with a plurality of different storage and message platforms are utilized, wherein the modern attachments are hyperlinks in electronic messages that point to files or folders in cloud storage;

electronically generating a report based on the discovery, the report including metadata about the modern attachments and indicating which modern attachment links cannot be accessed;

electronically utilizing the report to determine how the modern attachments are to be handled to meet specified requirements of the organization; and based on the report, electronically migrating messages of an existing platform from the existing platform to a location where both the messages of the existing platform and respective copies of source files of corresponding modern attachments exist in a same controlled environment.

2. The method of claim 1, further comprising:

establishing a journaling platform that copies additional messages of the existing platform as the additional messages of the existing platform are sent or received while collecting respective copies of source files of any modern attachments associated with the additional messages of the existing platform and depositing both in the same controlled environment.

3. The method of claim 1, further comprising:

performing discovery on respective messaging repositories of a plurality of different organizations to determine an extent to which modern attachments are utilized by each of the plurality of organizations;

generating a custom report for each organization of the plurality of different organizations based on the discovery, wherein each custom report includes metadata about modern attachments associated with the organization and indicates which modern attachment links cannot be accessed;

utilizing each custom report to determine how modern attachments are to be handled for each organization of the plurality of organization to meet specified requirements of each organization of the plurality of organizations; and for each organization of the plurality of organizations, migrating messages associated with the organization from a respective existing platform to a location specific for the organization where both the messages associated with the organization and respective copies of source files of corresponding modern attachments associated with the organization exist in the same controlled environment.

4. The method of claim 1, wherein migrating the messages of the existing platform from the existing platform includes:

identifying modern attachments in the messages of the existing platform;

pulling respective copies of source files from links associated with the modern attachments;

copying the messages of the existing platform to, and storing the respective copies of source files in, one or more destination storages; and redirecting a modern attachment link in a copied message to a corresponding respective copy of a source file stored in a destination storage of the one or more destination storages.

5. The method of claim 1, wherein migrating the messages of the existing platform from the existing platform includes:

identifying modern attachments in the messages of the existing platform;

pulling respective copies of source files from links associated with the modern attachments;

adding the respective copies of source files to corresponding ones of the messages of the existing platform as standard attachments; and sending the messages of the existing platform and the respective copies of the source files to one or more destination storages.

6. The method of claim 1, wherein migrating the messages of the existing platform includes:

creating a shadow copy of a target of a modern attachment in a message;

placing the shadow copy in a common storage area; and redirecting a modern attachment link in the message to the shadow copy.

7. The method of claim 1, further comprising:

performing eDiscovery collection on data at rest, wherein the eDiscovery collection includes:

identifying messages associated with custodians on legal hold and modern attachments associated with the custodians on legal hold;

copying the identified messages associated with the custodians on legal hold and the modern attachments associated with the custodians on legal hold to a hold storage with a hold feature that retains data until the hold is released; and preventing custodians from accessing content in the hold storage.

8. A system for managing modern attachments in electronic messages, the system comprising:

at least one processor; and a memory storing instructions that, when executed by the at least one processor, cause the system to:

electronically perform discovery on an organization's messaging repository to determine an extent to which modern attachments associated with a plurality of different storage and message platforms are utilized, wherein the modern attachments are hyperlinks in electronic messages that point to files or folders in cloud storage;

electronically generate a report based on the discovery, the report including metadata about the modern attachments and indicating which modern attachment links cannot be accessed;

electronically utilize the report to determine how the modern attachments are to be handled to meet specified requirements of the organization; and based on the report, electronically migrate messages of an existing platform from the existing platform to a location where both the messages of the existing platform and respective copies of source files of corresponding modern attachments exist in a same controlled environment.

9. The system of claim 8, wherein the instructions further cause the system to:

establish a journaling platform that copies additional messages of the existing platform as the additional messages of the existing platform are sent or received while collecting respective copies of source files of any modern attachments associated with the additional messages of the existing platform and depositing both in the same controlled environment.

10. The system of claim 8, wherein the instructions further cause the system to:

perform discovery on respective messaging repositories of a plurality of different organizations to determine an extent to which modern attachments are utilized by each of the plurality of organizations;

generate a custom report for each organization of the plurality of different organizations based on the discovery, wherein each custom report includes metadata about modern attachments associated with the organization and indicates which modern attachment links cannot be accessed;

utilize each custom report to determine how modern attachments are to be handled for each organization of the plurality of organization to meet specified requirements of each organization of the plurality of organizations; and for each organization of the plurality of organizations, migrate messages associated with the organization from a respective existing platform to a location specific for the organization where both the messages associated with the organization and respective copies of source files of corresponding modern attachments associated with the organization exist in the same controlled environment.

11. The system of claim 8, wherein the instructions to migrate the messages of the existing platform from the existing platform cause the system to:

identify modern attachments in the messages of the existing platform;

pull respective copies of source files from links associated with the modern attachments;

copy the messages of the existing platform to, and store the respective copies of source files in, one or more destination storages; and redirect a modern attachment link in a copied message to a corresponding respective copy of a source file stored in a destination storage of the one or more destination storages.

12. The system of claim 8, wherein the instructions to migrate the messages of the existing platform from the existing platform cause the system to:

identify modern attachments in the messages of the existing platform;

pull respective copies of source files from links associated with the modern attachments;

add the respective copies of the source files to corresponding ones of the messages of the existing platform as standard attachments; and send the messages of the existing platform and the copy of the source files to one or more destination storages.

13. The system of claim 8, wherein the instructions to migrate the messages of the existing platform cause the system to:

create a shadow copy of a target of a modern attachment in a message;

place the shadow copy in a common storage area; and redirect a modern attachment link in the message to the shadow copy.

14. The system of claim 8, wherein the instructions further cause the system to:

perform eDiscovery collection on data at rest, wherein the eDiscovery collection includes:

identifying messages associated with the custodians on legal hold and modern attachments associated with the custodians on legal hold;

copying the identified messages associated with the custodians on legal hold and the modern attachments associated with the custodians on legal hold to a hold storage with a hold feature that retains data until the hold is released; and preventing custodians from accessing content in the hold storage.

15. A non-transitory computer-readable medium storing instructions that, when executed by at least one processor, cause the at least one processor to perform operations for managing modern attachments in electronic messages, the operations comprising:

electronically performing discovery on an organization's messaging repository to determine an extent to which modern attachments associated with a plurality of different storage and message platforms are utilized, wherein the modern attachments are hyperlinks in electronic messages that point to files or folders in cloud storage;

electronically generating a report based on the discovery, the report including metadata about the modern attachments and indicating which modern attachment links cannot be accessed;

electronically utilizing the report to determine how the modern attachments are to be handled to meet specified requirements of the organization; and based on the report, electronically migrating messages of an existing platform from the existing platform to a location where both the messages of the existing platform and respective copies of source files of corresponding modern attachments exist in a same controlled environment.

16. The non-transitory computer-readable medium of claim 15, wherein the operations further comprise:

establishing a journaling platform that copies additional messages of the existing platform as the additional messages of the existing platform are sent or received while collecting respective copies of source files of any modern attachments associated with the additional messages of the existing platform and depositing both in the same controlled environment.

17. The non-transitory computer-readable medium of claim 15, wherein the operations further comprise:

performing discovery on respective messaging repositories of a plurality of different organizations to determine an extent to which modern attachments are utilized by each of the plurality of organizations;

generating a custom report for each organization of the plurality of different organizations based on the discovery, wherein each custom report includes metadata about modern attachments associated with the organization and indicates which modern attachment links cannot be accessed;

utilizing each custom report to determine how modern attachments are to be handled for each organization of the plurality of organization to meet specified requirements of each organization of the plurality of organizations; and for each organization of the plurality of organizations, migrating messages associated with the organization from a respective existing platform to a location specific for the organization where both the messages associated with the organization and respective copies of source files of corresponding modern attachments associated with the organization exist in the same controlled environment.

18. The non-transitory computer-readable medium of claim 15, wherein migrating the messages of the existing platform from the existing platform includes:

identifying modern attachments in the messages of the existing platform;

pulling respective copies of source files from links associated with the modern attachments;

copying the messages of the existing platform to, and storing the respective copies of source files in, one or more destination storages; and redirecting a modern attachment link in a copied message to a corresponding respective copy of a source file stored in a destination storage of the one or more destination storages.

19. The non-transitory computer-readable medium of claim 15, wherein migrating the messages of the existing platform from the existing platform includes:

identifying modern attachments in the messages of the existing platform;

pulling respective copies of source files from links associated with the modern attachments;

adding the respective copies of source files to corresponding ones of the messages of the existing platform as standard attachments; and sending the messages of the existing platform and the respective copies of the source files to one or more destination storages.

20. The non-transitory computer-readable medium of claim 15, wherein migrating the messages of the existing platform includes:

creating a shadow copy of a target of a modern attachment in a message;

placing the shadow copy in a common storage area; and redirecting a modern attachment link in the message to the shadow copy.

* * * * *